US009351179B2

(12) United States Patent
Garrett et al.

(10) Patent No.: US 9,351,179 B2
(45) Date of Patent: May 24, 2016

(54) USING ONE OR MORE PAST CHANNEL ESTIMATES FOR ADJUSTING PARAMETERS, SENSING OBJECT PRESENCE, OR ALLOWING ASSOCIATION

(71) Applicant: Broadcom Corporation, Irvine, CA (US)

(72) Inventors: David Garrett, Tustin, CA (US); Nihar Jindal, San Mateo, CA (US); Jun Zheng, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 90 days.

(21) Appl. No.: 14/268,677

(22) Filed: May 2, 2014

(65) Prior Publication Data

US 2015/0237513 A1     Aug. 20, 2015

Related U.S. Application Data

(60) Provisional application No. 61/941,921, filed on Feb. 19, 2014.

(51) Int. Cl.
*H04W 24/02* (2009.01)
*H04L 25/02* (2006.01)

(52) U.S. Cl.
CPC ........... *H04W 24/02* (2013.01); *H04L 25/0222* (2013.01); *H04L 25/0224* (2013.01); *H04L 25/0228* (2013.01)

(58) Field of Classification Search
CPC .......................... H04W 24/02; H04W 25/0228
See application file for complete search history.

(56) References Cited

U.S. PATENT DOCUMENTS

| | | | |
|---|---|---|---|
| 2009/0060010 A1* | 3/2009 | Maheshwari et al. | 375/211 |
| 2009/0274224 A1* | 11/2009 | Harris | 375/260 |
| 2010/0248635 A1* | 9/2010 | Zhang et al. | 455/63.1 |
| 2011/0128947 A1* | 6/2011 | Liu et al. | 370/338 |
| 2012/0120839 A1* | 5/2012 | Liu et al. | 370/252 |
| 2013/0094488 A1* | 4/2013 | Choi et al. | 370/338 |
| 2014/0211684 A1* | 7/2014 | Liu et al. | 370/312 |
| 2015/0030094 A1* | 1/2015 | Zhang | 375/267 |

* cited by examiner

*Primary Examiner* — Albert T Chou
(74) *Attorney, Agent, or Firm* — Foley & Lardner LLP; Christopher J. McKenna; Paul M. H. Pua (57) ABSTRACT

Systems and methods can analyze a present channel estimation and a previous channel estimation and/or two or more prior channel estimations to improve communication performance, sense environmental conditions, and make location and velocity determinations. The methods can include: (a) sending, by a transmitter, a first sounding frame and a second sounding frame to a receiver; (b) receiving, by the transmitter, a first channel estimation response from a receiver responsive to the first sounding frame, and a second channel estimation response from the receiver responsive to the second sounding frame; and (c) detecting, by the transmitter, based at least on the first channel estimation response and the second channel estimation response, if a change in characteristics of a channel between the transmitter and the receiver occurred between the first sounding frame and the second sounding frame.

20 Claims, 5 Drawing Sheets

USING ONE OR MORE PAST CHANNEL ESTIMATES FOR ADJUSTING PARAMETERS, SENSING OBJECT PRESENCE, OR ALLOWING ASSOCIATION

CROSS REFERENCE TO RELATED APPLICATIONS

This application claims the benefit of and priority to U.S. Provisional Application Ser. No. 61/941,921, filed Feb. 19, 2014, entitled "METHODS AND SYSTEMS USING ONE OR MORE PAST CHANNEL ESTIMATES FOR ADJUSTING PARAMETERS, SENSING OBJECT PRESENCE, OR ALLOWING ASSOCIATION", assigned to the assignee of this application, and which is incorporated herein by reference for all purposes.

FIELD OF THE DISCLOSURE

This disclosure generally relates to systems for and methods of using channel estimations in communications system. In particular, this disclosure relates to systems for and methods of adjusting parameters, sensing objects, sensing locations, or allowing association in a wireless communication environment.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and RF circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As higher data throughput and other changes develop, newer standards are constantly being developed for adoption, such as a progression from IEEE 802.11n to IEEE 802.11ac.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION OF THE PREFERRED EMBODIMENTS

The following IEEE standard(s), including any draft versions of the standard(s), are hereby incorporated herein by reference in their entirety and are made part of the present disclosure for all purposes: IEEE P802.11n™; and IEEE P802.11ac™. Although this disclosure can reference aspects of these standard(s), the disclosure is in no way limited by these standard(s).

For purposes of reading the description of the various embodiments below, the following descriptions of the sections of the specification and their respective contents can be helpful: Section A describes a network environment and computing environment which can be useful for practicing embodiments described herein; and Section B describes embodiments of systems and methods for using one or more channel estimates. Embodiments of the systems and methods can analyze a present channel estimation and a previous channel estimation and/or two or more prior channel estimations to improve communication performance, sense environmental conditions, and make location and velocity determinations. Embodiments of the systems and methods can locate devices and determine movement of devices using channel estimation feedback and/or electro-magnetic (EM) patterns.

A. Computing and Network Environment

Figure 1A:
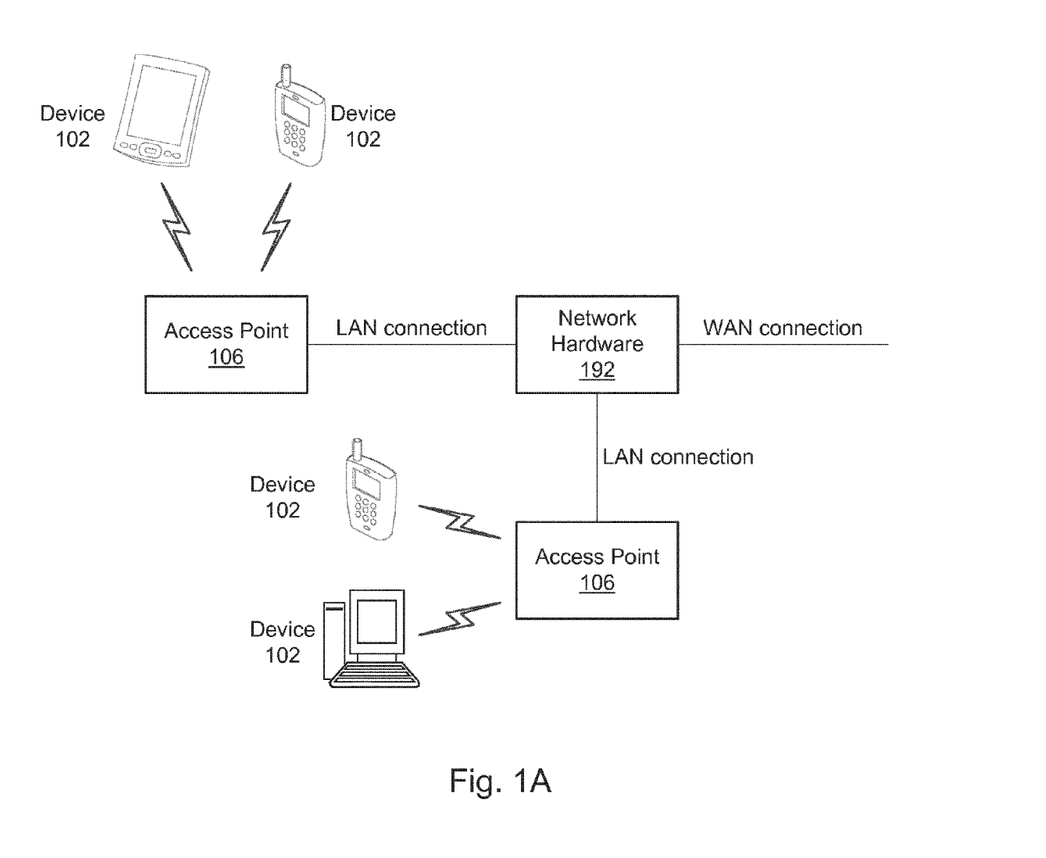
FIG. 1A is a block diagram depicting an embodiment of a network environment including one or more access points in communication with one or more devices or stations.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or access point are described in greater detail with reference to FIGS. 1B and 1C. The network environment can be an ad hoc network environment, an infrastructure wireless network environment, a subnet environment, etc. in one embodiment.

The access points (APs) 106 can be operably coupled to the network hardware 192 via local area network connections. The network hardware 192, which can include a router, gateway, switch, bridge, modem, system controller, appliance, etc., can provide a local area network connection for the communication system. Each of the access points 106 can have an associated antenna or an antenna array to communicate with the wireless communication devices in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments an access point 106 includes a device or module (including a combination of hardware and software) that allows wireless communication devices 102 to connect to a wired network using Wi-Fi, or other standards. An access point 106 can sometimes be referred to as an wireless access point (WAP). An access point 106 can be configured, designed and/or built for operating in a wireless local area network (WLAN). An access point 106 can connect to a router (e.g., via a wired network) as a standalone device in some embodiments. In other embodiments, an access point 106 can be a component of a router. An access point 106 can provide multiple devices access to a network. The access point 106 can, for example, connect to a wired Ethernet connection and provides wireless connections using radio frequency links for other devices 102 to utilize that wired connection. The access point 106 can be built and/or implemented to support a standard for sending and receiving data using one or more radio frequencies. Those standards, and the frequencies they use can be defined by the IEEE (e.g., IEEE 802.11 standards). The access point 106 can be configured and/or used to support public Internet hotspots, and/or on an internal network to extend the network's Wi-Fi signal range.

In some embodiments, the access points 106 can be used for (e.g., in-home or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more access points 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
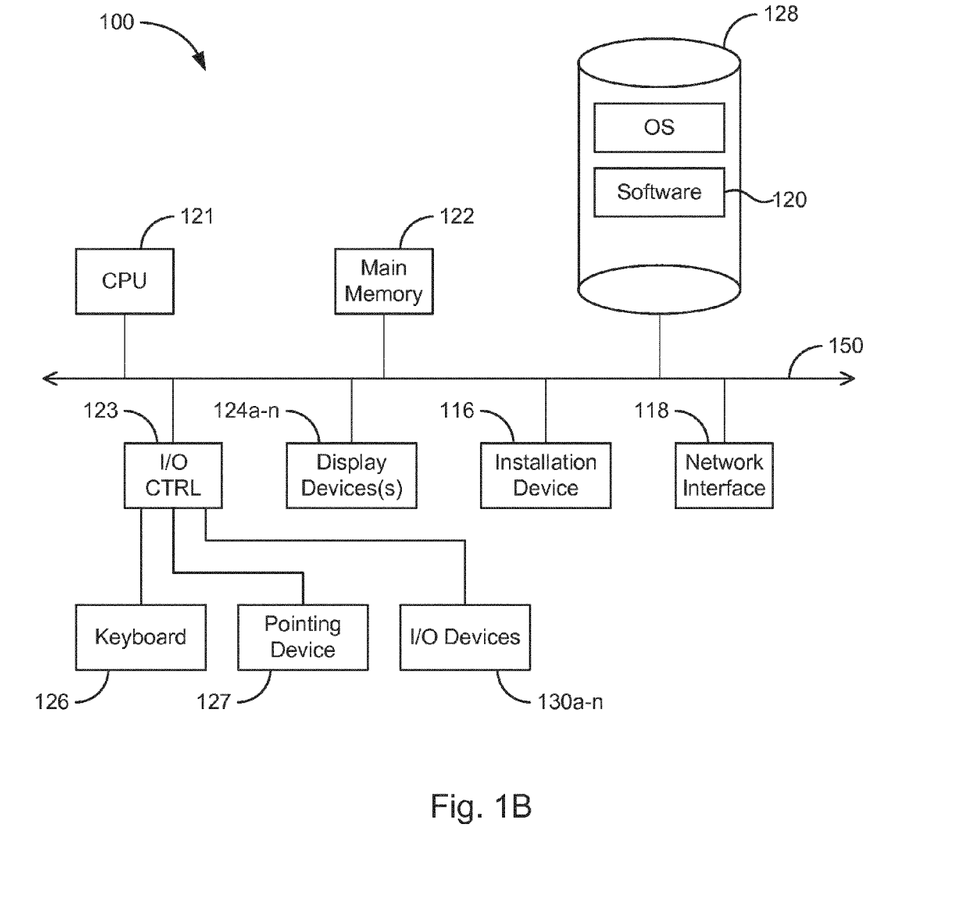
FIGS. 1B and 1C are block diagrams depicting embodiments of computing devices useful in connection with the methods and systems described herein.
Figure 1C:
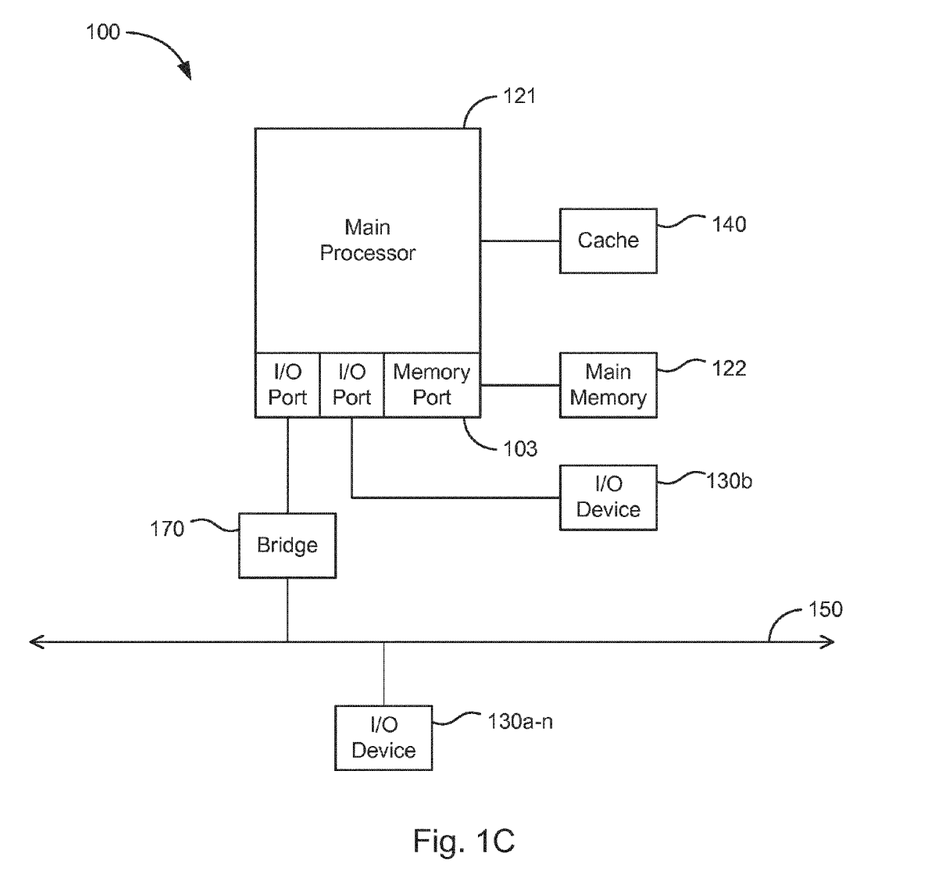

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication device 102 (e.g., a user) or access point 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., software 120 configured, designed and/or customized for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11 ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple displays 124a-124n. One ordinarily skilled in the art will recognize and appreciate the various ways and embodiments that a computing device 100 can have one or more display devices 124a-124n.

In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Using One or More Past Channel Estimates and/or EM Patterns

Described herein with reference to FIGS. 2-5 are systems and methods for using an EM pattern or at least one past channel estimation to adjust parameters, sense persons/objects, locate users, or allow association. The EM pattern or channel estimate can be between a beamformer such as, the access point 106 and a beamformee such as at least one of the wireless devices 102 (users or station (STAs)) using a multi-user frame (e.g., an MU-MIMO frame) or single-user frame (e.g., SU-MIMO frame) for communication in one embodiment. In some embodiments, the EM pattern or channel estimate can be between any two wireless devices 102 (e.g., wireless devices communicating using SU-MIMO, MU-MIMO, or according to other protocols). In an MU-MIMO configuration, the beamformer can communicate a multi-user frame to one or more beamformees in one embodiment.

According to one embodiment, the access point 106 can send a sounding sequence (e.g., a null data packet announcement (NDPA) frame followed by a null data packet (NDP) frame) to one or more of the wireless communication devices 102 (e.g., STAs). Each device 102 provides feedback (e.g., a feedback frame) including quantized channel state information (CSI) data in one embodiment. The access point 106 stores the channel state information associated with the CSI data from the devices 102 in one embodiment. The access point 106 uses the stored information to determine channel aging or Doppler changes in one embodiment.

The device 102 can measure correlations between sounding feedback frames including channel estimations such as quantized channel state information (and actively adjust the sounding feedback) for communications between the access point 106 and the device 102 in one embodiment. Further, the correlation between the sounding feedback frames can be utilized to estimate the device's velocity (or relative velocity with the access point 106) for future communications.

In one embodiment, the device 102 can use successive NDP soundings and feedback to detect the presence of objects, such as persons or other types of objects in the room. Users, persons, or other types of objects (e.g. new devices of users) in the room can affect the channel estimates (e.g., CSI data or CSI matrix) due to their movement and/or presence, for example, by affecting a transmission radiation pattern for the channel. For example, the types of objects can include objects of certain materials or objects with certain properties that can affect or interfere with an EM field. Accordingly, changes in channel estimates can indicate the presence of persons in the room according to one embodiment. In some embodiments, changes in channel estimates can indicate the presence of a new device of a user in the room according to one embodiment.

In another embodiment, a present channel estimate or the successive channel estimates can be correlated with physical electromagnetic or antenna patterns (e.g., angle of arrival, time of flight, received signal strength information (RSSI)) to determine location. The beamformer (e.g., access point 106) only allow association when the beamformee (device 102) is in a known location, in some embodiments.

In some embodiments, the disclosure is directed to systems and methods for transmitting a number of sounding sequences (which include NDPA frames and NDP sounding frames) to a receiver for receiving channel estimation feedback to determine changes in the channel over time. The changes in the channel over time can be used to determine adjustments to the NDP sounding interval, multi-user link adaptation for appropriate modulation and coding schemes (MCS), to determine whether to operate in a single-user or multi-user mode, or to detect the presence of new users/objects or other changes affecting the channel characteristics.

In some embodiments, the transmitter can correlate or compare the sounding feedback report or reports with certain EM patterns of the transmitter to identify location and/or types of motion of the receiver. For example, a training stage can be used to acquire channel report(s) for a receiver at various locations and/or performing certain types of motion. Corresponding antenna patterns can be determined by measurement or modeling based on receiver locations and/or motions. The determination of a receiver's location can be used to decide whether MU-MIMO or other association is allowed and/or the quality of service accorded to the association.

In one embodiment, a transmitter can use a number of sounding sequences (NDPA followed by NDP sounding frames) to receive channel estimation feedback from a receiver to determine changes in the channel characteristic which can be used to improve operational efficiency, perform appropriate adaptation for improved performance, detect entrance of new users/objects, or to determine a location or motion of a receiver.

In some embodiments, the disclosure is directed to a method of using sounding frames for obtaining channel estimation responses. The method includes sending, by a transmitter, a first sounding sequence and a second sounding sequence to a receiver, and receiving, by a transmitter, a first channel estimation response from the receiver responsive to the first sounding sequence and a second channel estimation response from the receiver responsive to the second sounding sequence. The method can also include detecting, via the transmitter, based at least on the first channel estimation response and the second channel estimation response, if a change in characteristics of a channel between the transmitter and the receiver occurred, and determining via the transmitter whether to update a configuration of the transmitter based on the detection.

Another embodiment relates to a method of detecting presence of at least one person or other object in an environment including wireless devices. The method includes comparing a first channel estimation response to a first sounding sequence provided at a first time and a second channel estimation response to a second sounding sequence provided at a second time and detecting the presence of the at least one person or other object based at least on a difference between the first channel estimation response and the second channel estimation response.

In another embodiment, the present disclosure relates to a method of communication in an environment including wireless devices. The method includes providing a database of channels corresponding to locations in the environment and comparing a first channel estimation from a receiver to the channels in the database to determine if the receiver is in an allowed location.

In another embodiment, the present disclosure relates to a method of communication in an environment including wireless devices. The method includes receiving a first channel feedback from a wireless device. The method also includes comparing the first channel feedback to channels in a database or correlating the first channel feedback to EM patterns of an access point to determine if the wireless device is in an allowed location or has been moved according to a particular path of motion for granting association.

In other embodiments, the disclosure relates to access points, wireless devices, networks or systems that can perform any of the methods discussed above.

Figure 2:
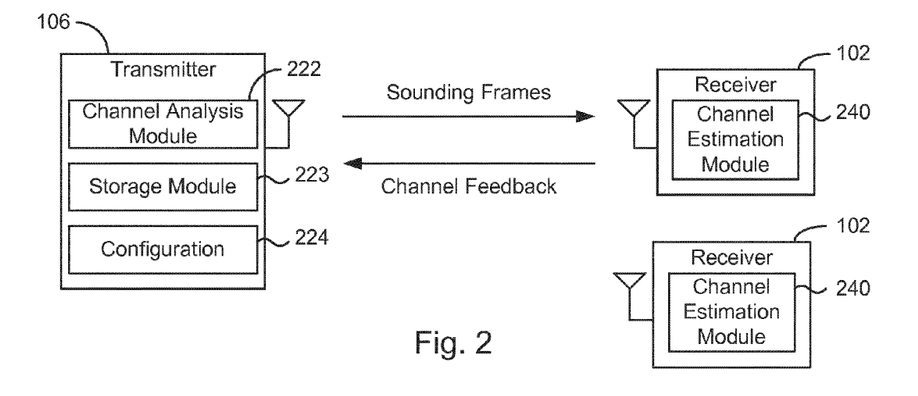
FIG. 2 is a block diagram depicting one embodiment of a system for communicating a frame using a past channel estimate to adjust a transmission parameter, to locate a device, to sense a presence of a person/object, or to allow association.

Referring to FIG. 2, an embodiment of a wireless communication system is depicted. In brief overview, the system includes the access point 106 having information to transmit to wireless devices such as wireless devices 102 (e.g., stations or STAs). The access point 106 can include a channel analysis module 222, a storage module 223 and/or a configuration 224. Wireless devices 102 can include a channel estimation module 240.

The access point 106 and/or the devices 102 can each be part of a radio including both a transmitter and/or a receiver. The access point 106 can be embodied as a beamformer, and can include one or more antennas (e.g., phase array antennas). The system can support a MU-MIMO transmission configuration between the access point 106 and the multiple devices 102. At least one device 102 has multi-user (MU) communication capabilities (e.g., MU-MIMO capabilities) in one embodiment. The access point 106 can use beamforming to transmit to each device 102 frame 112 with a unique payload or data field for each device 102. The access point 106 can determine which devices 102 in the environment have MU communication capabilities in one embodiment.

The access point 106 can regularly send sounding sequences (which includes NDPA followed by NDP sounding frames) to device 102 and receive channel feedback associated with the sounding frames from device 102. The channel feedback provides channel information (e.g., a channel estimation) about the channel in one embodiment. In one embodiment, the access point 106 sends sounding frames as part of an association process and can repeat the process as the access point 106 deems necessary.

Channel estimation modules 240 in devices 102 determine channel parameters (e.g., channel estimates) based upon analysis of the NDP or NDPA sounding frames. The channel parameters can include quantized CSI. The channel parameters are provided by devices 102 to access point 106 as channel feedback in one embodiment.

The channel feedback is stored in the storage module 223 in one embodiment. Storage module 223 can be any memory, drive, or storage component suitable for storing channel feedback (e.g., feedback frames). The storage module can provide a database of previous CSI, channel responses, estimates, characterizations etc. The information can be indexed by according to devices 102, channels, etc. The storage module 223 can include capability information regarding each device 102 and a database of channels which correspond to particular locations and which association is allowed at the particular locations (e.g., locations within a same room). The association information for the database can be acquired via training such as during the setup of the access point 106 using reports from devices 102 at various locations within the room. In addition, channel estimates can be provided into the storage module 223 to determine location based on antenna patterns of the access point 106. Modeling of the propagation environment of the room can also be utilized to provide information for the storage module 223.

The channel analysis module 222 of the access point 106 can analyze current channel feedback and previous channel feedback to make adjustments to transmission parameters or modes, to locate devices 102, or to sense objects in one embodiment. The channel analysis module 222 can analyze previous channel feedback stored in the module 223 to make adjustments to transmission parameters or modes, to locate devices 102, or to sense persons/objects in one embodiment. The channel analysis module 222 can analyze current channel feedback and/or previous channel feedback and EM patterns to locate devices 102 in one embodiment. Module 222 can receive the channel feedback at the physical layer and process the channel feedback in the media access control (MAC) layer and/or higher layers of the access point. The access point 106 via channel analysis module 222 can measure the correlation between successive channel estimates (e.g., stored in module 223) to determine a direct estimate of the degree of channel aging or rate of change of the channel in one embodiment. The channel analysis module 222 can perform sophisticated signal processing to measure power spectral density (PSD) of the time-fading process according to one embodiment. This information can be used to perform PSD-based channel prediction. Channel change information can also be used to estimate the wireless devices' absolute velocity and/or velocity in the direction with respect to the access point 106. The channel change information, such as velocity information, can be used to set transmission parameters (e.g., power levels, MCS levels, MU or SU mode, etc.).

In another embodiment, the access point 106 or module 222 can utilize the channel aging or rate of change information to assist with MU-MIMO or multi-unit link adaptation. Faster aging indicates that the MCS level can decrease rapidly with time. Accordingly, the access point 106 or module 222 can decide to select lower MCS levels, adjust power levels higher, or select modulation techniques that are more robust when channel aging or the rate of change of the channel is high.

In one embodiment, the channel analysis module 222 of the access point 106 can utilize the change in channel characteristics (e.g., channel aging or rate of change) to determine whether objects (e.g., persons, human beings, new devices, etc.) are present in a room. When multiple devices 102 are utilized (such as sensors, access points, phones, computers, etc.) change in successive NDP-sounding packets can indicate human presence or movement in the room. The change can be compared to a threshold, and when significant changes are present, a conclusion that humans are present in the room can be made. In one embodiment, the access point 106 and device 102 are stationary and the access point 106 continually sends sounding sequences (NDPA followed by NDP-sounding frames) to the devices 102 for sensing the presence of humans or new objects in the room. Each of the devices 102 measures the channel from each NDP-sounding frame and feeds back its channel information according to a standard VHT feedback protocol in one embodiment. In a stationary environment, the channel can vary relatively slowly in time (several hertz of Doppler). When an objects, such as a user or person or user device 102, enters a room, the Doppler can increase thereby allowing access point 106 to detect a significant change in the channel and conclude that an object, such as a person is present.

The module 222 can use stored sounding feedback reports in the storage module 223 and physical EM beam patterns, beam patterns associated with the access point 106 configured as a beamformer, to determine if the wireless device 102 is in an appropriate location. If the wireless device 102 is in an appropriate location (determined by module 222 correlating the feedback report with the physical EM patterns in one embodiment), the access point 106 can allow association. The EM patterns can represent a pointing angle to the device 102, e.g., an orientation of an antenna of the access point 106 with respect to the device 102.

When the access point 106 receives an uplink transmission or channel feedback from the device 102, the access point 106 compares the channel estimate to the channels in the database in the storage module 223 to determine if the device 102 is in an allowed location, in some embodiments. If so, the access point 106 allows association in one embodiment. In one embodiment, the access point 106 can allow association even if the device 102 is not in an allowed location but can reduce its quality of service depending upon location. The storage module 223 can include an index of quality of service per location in one embodiment. The access point 106 can change the configuration 224 in accordance with the rate of change of the channel or degree of channel aging to decide on an appropriate-sounding interval. The configuration 224 can include data for setting the NDP sounding interval, data for multi-user link adaptation for appropriate MCS, and data for setting a single-user (SU) or MU mode. For example, when the rate of change is higher, the module 222 can decrease the sounding interval in the configuration 224 so that NDP-sounding frames are provided more frequently in one embodiment. In another embodiment, module 222 can select the SU mode or change transmission characteristics for link adaptation in the configuration 224 when the rate of change or the degree of channel aging is high. Multi-user communication can only be appropriate and selected if aging is sufficiently low in one embodiment.

Figure 3:
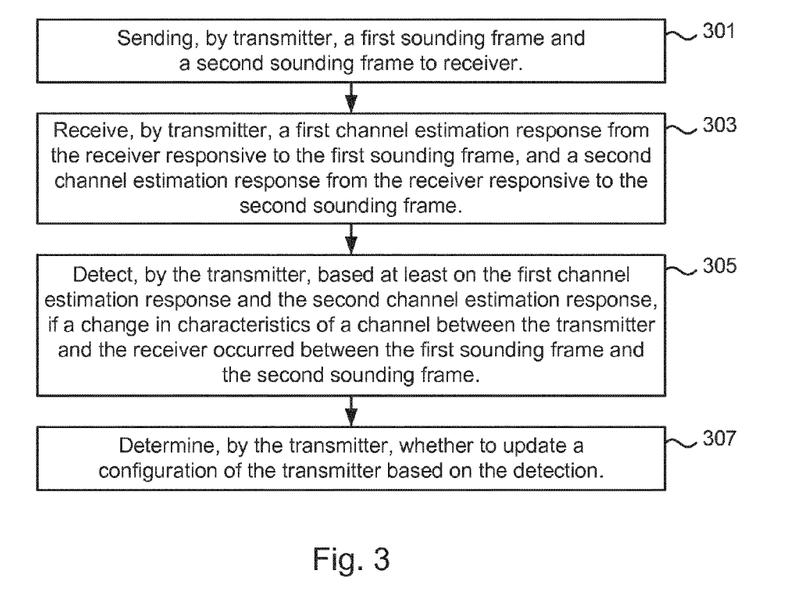
FIG. 3 is a flow diagram illustrating one embodiment of a method of using a past channel estimate to adjust a transmission parameter.

With reference to FIG. 3, a transmitter can be embodied as the access point 106 or other wireless device 102 and send a first sounding sequence and a second sounding sequence to receiver at an operation 301. At an operation 303, the access point 106 receives a first channel estimation response from the device 102 and a second channel estimation response from the device 102. The first channel estimation response is responsive to the first sounding sequence and the second channel estimation is responsive to the second sounding sequence, in one embodiment. At an operation 305, the channel analysis module 222 of the access point 106 detects based on at least one of the first channel response and the second channel response if a change in one or more characteristics of a channel between the access point 106 and the device 102 occurred. The access point 106 can update the configuration 224 based on the detection at an operation 307.

In the operation 301, the first and second sounding sequences can each include a NDPA frame followed by a NDP sounding frame provided according to an 802.11 standard in one embodiment. The sounding frames can be provided by the access point 106 before one or more MU packets are provided by the access point 106 in one embodiment. The sounding frames include information used by channel estimation module 240 to provide channel estimations in one embodiment.

In the operation 303, each of the one or more of the wireless devices 102 respond to the first and second sounding sequences with a feedback frame provided according to an 802.11 standard (e.g., VHT feedback protocol) in one embodiment. The feedback frames include the channel estimation response which can include quantized CSI in one embodiment. The feedback frame can be provided in response to a poll message from the access point 106 in one embodiment.

In the operation 305, the channel estimation responses (e.g., the quantized CSI) are analyzed by module 222 in one embodiment. The correlation between successive estimation responses provides a direct estimate of the degree of channel aging in one embodiment. Access point 106 can use this direct estimate to perform PSD-based channel prediction. The access point 106 can track the time between receipts of the estimation responses for making rate of change determinations.

In the operation 307, the module 222 can update the configuration 224 to improve communication performance in response to the degree of channel aging in one embodiment. Module 222 can make adjustments to the configuration 224 to change the NDP sounding interval, select multi-user link adaptation parameters, or to select a single-user or multi-user mode in one embodiment. The configuration 224 can be updated to more frequently or less frequently request channel feedback responses from devices 102 in one embodiment. The feedback responses can be requested via a sounding sequence (e.g., NDPA frame followed by NDP frame) in one embodiment.

In one embodiment, module 222 can determine the velocity of the wireless device 102 after operation 305. The velocity can be stored in the module 223 or provided to configuration 224 for use in future communications with the access point 106. The velocity can be an absolute velocity or relative velocity with the access point 106.

Figure 4:
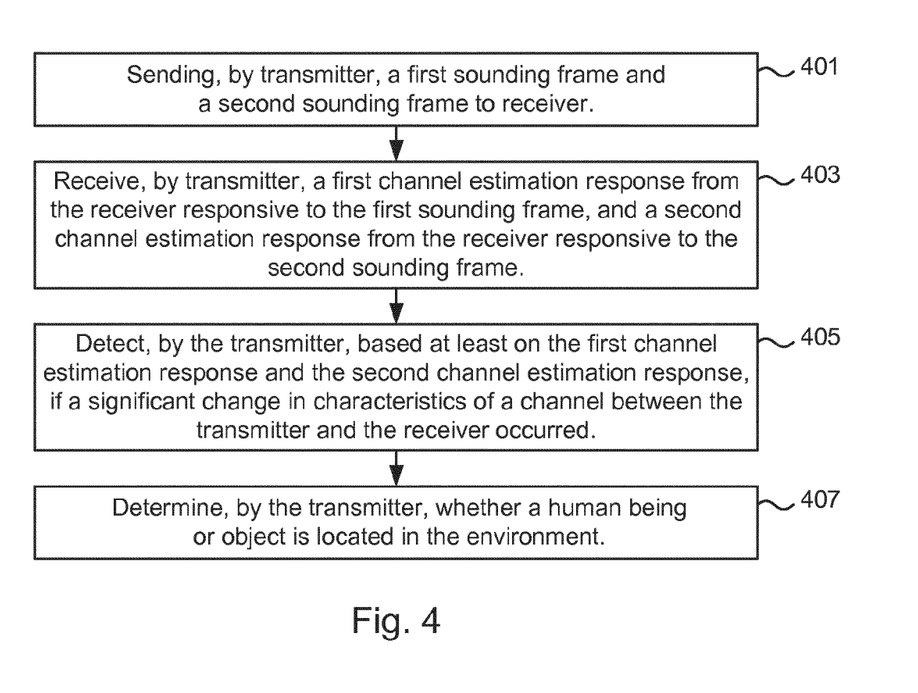
FIG. 4 is a flow diagram illustrating one embodiment of a method of sensing a presence of a person or object.

With reference to FIG. 4, the access point 106 can provide sounding frames and receive channel estimation responses in operations 401 and 403 similar to operations 301 and 303 discussed above respectively. At an operation 405, the module 222 of the access point 106 detects a rate of change associated with the channel estimates and compares the rate of change to a threshold. If the rate of change is above a threshold in the operation 405, the access point 106 determines if an object, such as a person is located in the environment based upon the change in an operation 407 in one embodiment. The detection of the human being can be used to set thermostats, turn on heaters/air conditioners, provide security features and/or alarms, allow access to the network, etc.

In the operation 401, the first and second sounding frames can be NDPA and NDP sounding frames provided according to an 802.11 standard in one embodiment. The sounding frames can be provided by the access point 106 before one or more MU packets are provided by the access point 106 in one embodiment. The sounding frames are provided from a stationary access point 106 to one or more stationary devices in one embodiment. In one embodiment, the wireless device 102 can be a desk-top computer and the access point 106 can be wall mounted. The storage module 223 can include parameters as to which devices 102 are stationary. The status of each device can be obtained through user input, or by analyzing channel characteristics over time. Devices 102 can include a motion sensor for indicating when device 102 is stationary. When stationary as determined by the motion sensor, the devices 102 can indicate the stationary status using the feedback frame in one embodiment.

In the operation 403, each of the one or more of the stationary wireless devices 102 respond to the first and second sounding sequences with a feedback frame provided according to an 802.11 standard in one embodiment. In one embodiment, the feedback frame can include an indication that the device 102 is stationary. The feedback frames include the channel estimation response which can include quantized CSI in one embodiment. The feedback frame can be provided in response to a poll message from the access point 106 in one embodiment. In one embodiment, the sounding frames and feedback frames are continuously provided between the stationary access point 106 and the stationary devices 102.

In the operation 405, the channel estimation responses (e.g., the quantized CSI) are analyzed by module 222 in one embodiment. The correlation between successive estimation responses provides a direct estimate of the degree of channel changes in one embodiment.

In the operation 307, the module 222 can compare the degree of channel changes to a threshold in one embodiment. The threshold can be a Doppler threshold in one embodiment. In an environment with stationary devices 102 and a stationary access point 106, the channel generally changes at a low rate (e.g., a few Hertz Doppler) in one embodiment. A channel change greater than several Hertz Doppler indicates entrance of a person or object or movement of the person or object in the room.

The channel characteristics or other data associated with the first sounding sequence and the second sounding sequence can be stored in the storage module 223 for comparisons. Comparisons can be made with respect to a historical average and the historical average can be continually updated. In one embodiment, the change is monitored with respect to a historical average of the last two, three, or four readings of channel characteristics, as examples.

Figure 5:
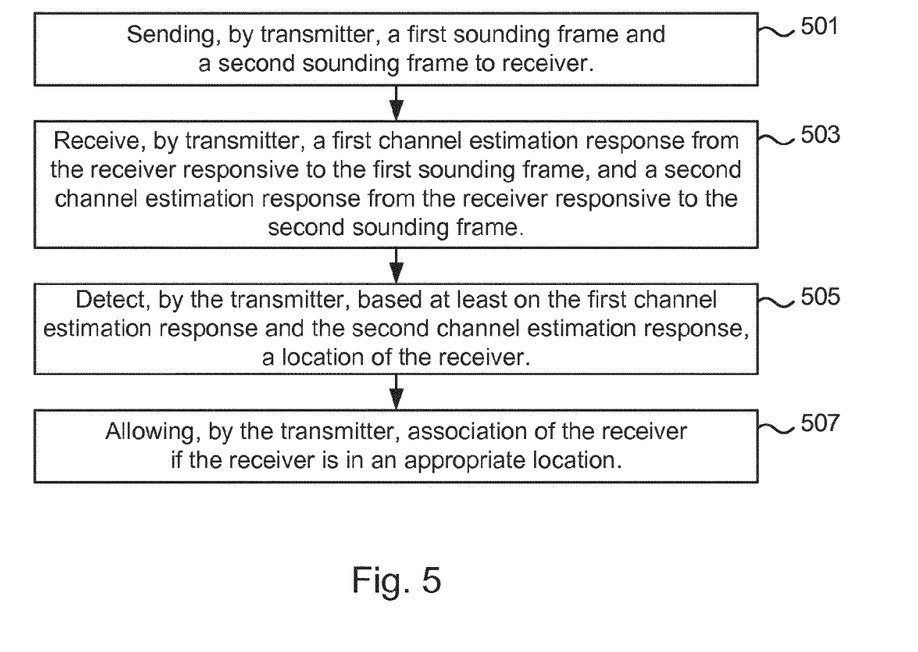
FIG. 5 is a flow diagram illustrating one embodiment of a method of allowing association.

With reference to FIG. 5, the access point 106 performs operations 501 and 503 similar to respective operations 301 and 303 discussed above. At an operation 505, the access point 106 can access a database of channel estimations associated with particular locations in an environment. In an operation 507, the access point 106 can determine the location of the wireless device 102 using a channel estimation response and a stored channel estimation response. In the operation 507, the access point 106 can allow the device 102 to associate (e.g., communicate with the access point 106, allow a level of quality of service, and/or a MU-MIMO configuration) if the device 102 is in an appropriate location. The storage module 223 can store a database of channel characteristics indexed with respect to locations in one embodiment.

In one embodiment, operation 507 can be used to allow access to a network without the use of a password. For example, the device 102 can be taken to a particular area of the room for access to the network. In one embodiment, the device 102 stays at the location for a period of time (e.g., three seconds). After association, device 102 can move from the location and continue operations as normal in one embodiment.

In another embodiment, devices 12 can be moved in a certain fashion to allow association. For example, the operations 501, 503, 504, and 507 can be used to determine movement of the device 102 and allow association if the device 102 is moved in a circular fashion (or other path/pattern of movement) at a particular location. In one embodiment, the particular location can be in specific area in the environment of the access point or in the environment of the access point 106. In one embodiment, the specific area is within a range of the access point 106 (e.g., within two meters). The movement in the circle or other pattern is used instead of entering a password in one embodiment. This association technique can be advantageous for devices 102 that do not include a keypad for entering passwords, for example sensors, thermostats, cameras, security devices, etc.

Storage module 223 can store the patterns of movement in certain embodiments. Each device 102 can have a unique or somewhat unique pattern of movement in one embodiment. Module 222 can analyze the changing location of the device 102 to determine if the pattern of movement matches the movement in one embodiment. The pattern or patterns can be programmed during training and stored in storage module 223. In one embodiment, movement and/or location is tracked using a correlation of EM patterns to a feedback report rather than using operations 501, 503, and 504.

Although examples of communications systems described above can include STAs and APs operating according to an 802.11 standard, it should be understood that embodiments of the systems and methods described can operate according to other standards and use wireless communications devices other than devices configured as STAs and APs. For example, multiple user and single user communications capable interfaces associated with cellular networks, satellite communications, vehicle communication networks, and other non-802.11 wireless networks can utilize the systems and methods described herein without departing from the scope of the systems and methods described herein.

It should be noted that certain passages of this disclosure can reference terms such as "first" and "second" in connection with devices, number of bits, transmission durations, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method of obtaining channel estimation responses, comprising:
   sending, by a transmitter, a first sounding sequence and a second sounding sequence to a receiver;
   receiving, by the transmitter, a first channel estimation response from a receiver responsive to the first sounding sequence, and a second channel estimation response from the receiver responsive to the second sounding sequence;
   detecting, by the transmitter, based at least on the first channel estimation response and the second channel estimation response, responsive to determining that a change in at least one characteristic of a channel between the transmitter and the receiver occurred; and
   determining, by the transmitter, whether to update a configuration of the transmitter based on the detection.

2. The method of claim 1, wherein one or both of the first sounding sequence or the second sounding sequence comprises a null data packet announcement (NDPA) frame followed by a null data packet (NDP).

3. The method of claim 1, further comprising identifying a time difference associated with the first channel estimation response and the second channel estimation response.

4. The method of claim 3, further comprising determining an estimated velocity of the receiver.

5. The method of claim 3, further comprising determining a rate of change in the at least one characteristic of the channel based at least on the identified time difference.

6. The method of claim 1, wherein determining whether to update the configuration of the transmitter based on the detection comprises determining, by the transmitter, a next time instant for sending a third sounding sequence based on the detection.

7. The method of claim 1, wherein determining whether to update the configuration of the transmitter based on the detection comprises determining, by the transmitter, a next time instant for sending a third sounding sequence based on an extent of change in the at least one characteristic of the channel.

8. The method of claim 1, further comprising updating the configuration of the transmitter, the updated configuration pertaining to modulation and coding scheme support for the receiver.

9. The method of claim 1, wherein determining whether to update the configuration of the transmitter based on the detection comprises determining, by the transmitter, whether to operate in a mode for supporting a single receiver or a single spatial stream, or a mode for supporting multiple receivers or multiple spatial streams.

10. The method of claim 1, further comprising determining a characteristic of the receiver's motion.

11. The method of claim 1, further comprising detecting a presence of a new device using the at least one characteristic of the channel.

12. The method of claim 1, further comprising correlating or comparing, by the transmitter, data in at least one of the first channel estimation response and the second channel estimation response, with one or more electromagnetic patterns in the transmitter, to identify one or more of: a type of motion and a location of the receiver.

13. The method of claim 1, further comprising sending, by the transmitter, the first sounding sequence and the second sounding sequence to the receiver as part of a training phase for acquiring channel estimation feedback based on at least one of: the receiver occupying a plurality of locations and performing certain types of motion.

14. The method of claim 1, further comprising determining, by the transmitter, an electromagnetic pattern of the transmitter by measurement or modeling based on one or more of: a receiver location and receiver motion.

15. The method of claim 1, further comprising determining a location of the receiver.

16. The method of claim 1, further comprising determining at least one of the following: whether to establish a multi-input multi-output (MIMO) association with the receiver, and a quality of service to accord to the receiver, based at least on the location of the receiver.

17. A method of detecting a person or object, the method comprising:
   comparing a first channel estimation response to a first sounding sequence provided at a first time and a second channel estimation response to a second sounding sequence provided at a second time, the first channel estimation response and the second channel estimation response received from a stationary device;
   determining, according to the comparison, that a degree of change to a channel exceeds a predefined Doppler threshold; and
   determining, responsive to the determination that the degree of change to the channel exceeds the predefined Doppler threshold, that movement of at least one person or object has occurred in a predetermined area.

18. The method of claim 17 wherein a transmitter provides the first sounding sequence and the second sounding sequence and receives the first channel estimation response and the second channel estimation response from a receiver of the stationary device, and the transmitter performs the detecting.

19. A method of communication, the method comprising:
   receiving a first channel feedback from a wireless device; and
   correlating the first channel feedback to electro-magnetic patterns of an access point; and
   determining, according to the correlation, whether the wireless device is in an allowed location or has been moved according to a particular path of motion for granting association.

20. The method of claim 19, wherein the wireless device is allowed to associate or is provided a particular quality of service depending upon being in the allowed location.

* * * * *